United States Patent [19]

Kawamoto

[11] Patent Number: 5,507,027
[45] Date of Patent: Apr. 9, 1996

[54] PIPELINE PROCESSOR WITH HARDWARE LOOP FUNCTION USING INSTRUCTION ADDRESS STACK FOR HOLDING CONTENT OF PROGRAM COUNTER AND RETURNING THE CONTENT BACK TO PROGRAM COUNTER

[75] Inventor: Koji Kawamoto, Itami, Japan

[73] Assignee: Mitsubishi Denki Kabushiki Kaisha, Tokyo, Japan

[21] Appl. No.: 363,114

[22] Filed: Dec. 23, 1994

[30] Foreign Application Priority Data

Dec. 28, 1993 [JP] Japan ................... 5-335377

[51] Int. Cl.⁶ ........................... G06F 9/00; G06F 9/40
[52] U.S. Cl. ................. 395/375; 364/231.8; 364/244.3; 364/251; 364/251.1; 364/259.2; 364/261.3; 364/262; 364/262.1; 364/262.4; 364/DIG. 1
[58] Field of Search ............................... 395/375, 800, 395/725, 775, 200; 364/DIG. 1

[56] References Cited

U.S. PATENT DOCUMENTS

| | | |
|---|---|---|
| 3,593,306 | 7/1971 | Toy et al. ............................ 395/375 |
| 3,736,567 | 5/1973 | Lotan et al. ........................ 395/775 |
| 4,097,920 | 6/1978 | Ozga .................................. 395/375 |
| 4,462,074 | 7/1984 | Linde ................................. 395/200 |
| 4,652,997 | 3/1987 | Kloker .............................. 395/375 |
| 4,792,892 | 12/1988 | Mary et al. ........................ 395/375 |
| 4,882,701 | 11/1989 | Ishii ................................... 395/375 |
| 4,910,664 | 5/1990 | Arizono ............................. 395/375 |
| 5,056,004 | 10/1991 | Ohde et al. ......................... 395/375 |
| 5,101,484 | 3/1992 | Kohn ................................. 395/375 |
| 5,303,355 | 4/1994 | Gergen et al. ..................... 395/375 |
| 5,371,862 | 12/1994 | Suzuki et al. ..................... 395/375 |

FOREIGN PATENT DOCUMENTS 57-114950  7/1982  Japan.

OTHER PUBLICATIONS

DSP56000/DSP56001 Digital Signal processor User's Manual, pp. 7-20-7-21, Motorola.
DSP56116 Digital Signal Processor User's Manual, pp. 603, Motorola.
Ulrich Holtmann et al; "Experiments with Low–Level Speculative Computation Based on Multiple Branch Prediction;" IEEE Transaction on VLSI vol. 7, No. 3, Sep. 1993.
Tirumalai et al; "Parallelization of Loops with exist on Pipelined Architectures" Hewlett–Packard Laboratories; IEEE May 1990.

Primary Examiner—Meng-Ai An
Attorney, Agent, or Firm—Lowe, Price, LeBlanc & Becker

[57] ABSTRACT

A pipeline processor having a hardware loop function, and having transfer paths L14 and L13 which directly transfer a value of a flag register 10 being set according to the results of the operations to a loop control unit 11, and so configured that the loop control unit 11 reads the value of the flag register 10 via the transfer paths L14 and L13 and terminates a loop processing when it is the predetermined value. The loop processing can be terminated without adversely affecting the data processing efficiency when a conditional jump instruction is executed during the loop processing, and operations, data transfers and other processings can be executed other than a loop-escaping operation.

4 Claims, 18 Drawing Sheets

FIG. 2

| FLAG REG. SYMBOL (bit) | SET CONDITION |
|---|---|
| X (bit 2) | SET WHEN LOOP-ESCAPING IS EXECUTED ACCORDING TO RESULT OF OPERATION EXECUTION |
| Z (bit 1) | SET WHEN RESULT OF OPERATION EXECUTION IS "0", OR CLEARED IN OTHER CASES |
| C (bit 0) | SET WHEN CARRY OR BORROW IS GENERATED BY RESULT OF OPERATION EXECUTION, OR CLEARED IN OTHER CASES |

FIG. 3

|  | 15 14 13 | 12 11 10 | 9 8 7 | 6 5 4 | 3 2 | 1 0 |
|---|---|---|---|---|---|---|
| NOP | 0 0 0 | 0 0 0 | 0 0 0 | 0 0 0 | 0 0 | 0 0 |
| JMP | 0 0 1 | cond | imm | | | |
| CALL | 0 1 0 | cond | imm | | | |
| LOOP | 0 1 1 | cond | imm | | | |
| LOAD | 1 0 0 | dst | imm | | | |
| OP | 1 0 1 | dst | src | alu | dy | ad |
| RET | 1 1 0 | dst | src | alu | dy | ad |
| ENDLP | 1 1 1 | dst | src | alu | dy | ad |

FIG. 4

| "cond" FIELD VALUE(SYMBOL) | CONTENT |
|---|---|
| h'0(NON) | CONDITION IS ALWAYS NOT SATISFIED |
| h'1(ALL) | CONDITION IS ALWAYS SATISFIED |
| h'2(NC) | CONDITION IS SATISFIED WHEN C FLAG(b0) OF FLAG REG. 10 IS CLEARED |
| h'3(C) | CONDITION IS SATISFIED WHEN C FLAG(b0) OF FLAG REG. 10 IS SET |
| h'4(NZ) | CONDITION IS SATISFIED WHEN Z FLAG(b1) OF FLAG REG. 10 IS CLEARED |
| h'5(Z) | CONDITION IS SATISFIED WHEN Z FLAG(b1) OF FLAG REG. 10 IS SET |
| h'6(NX) | CONDITION IS SATISFIED WHEN X FLAG(b2) OF FLAG REG. 10 IS CLEARED |
| h'7(X) | CONDITION IS SATISFIED WHEN X FLAG(b2) OF FLAG REG. 10 IS SET |

FIG. 5

| "Imm" FIELD | |
|---|---|
| VALUE (SYMBOL) | CONTENT |
| h'0~h'3ff | SPECIFY IMMEDIATE SET IN PROGRAM COUNTER 4, LOOP COUNTER 6 ETC. |

FIG. 6

| 'cond' FIELD | |
|---|---|
| VALUE(SYMBOL) | CONTENT |
| h'0(NON) | NOT SPECIFY DATA TRANSFER DESTINATION BY USING DATA BUS 12 |
| h'1(AR) | SPECIFY DATA ADD. REG. 14 AS DATA TRANSFER DESTINATION BY USING DATA BUS 12 |
| h'2(R0) | SPECIFY INPUT REG. R0 IN OPERATION EXECUTING UNIT 9 AS DATA TRANSFER DESTINATION BY USING DATA BUS 12 |
| h'3(R1) | SPECIFY INPUT REG. R1 IN OPERATION EXECUTING UNIT 9 AS DATA TRANSFER DESTINATION BY USING DATA BUS 12 |
| h'4(ACC) | SPECIFY ACCUMULATOR ACC IN OPERATION EXECUTING UNIT 9 AS DATA TRANSFER DESTINATION BY USING DATA BUS 12 |
| h'5(MEM) | SPECIFY ADD. IN DATA MEMORY 13 SPECIFIED BY DATA ADD. REG. 14 AS DATA TRANSFER DESTINATION BY USING DATA BUS 12 |
| h'6(LC) | SPECIFY LOOP COUNTER 6 AS DATA TRANSFER DESTINATION BY USING DATA BUS 12 |
| h'7(FR) | SPECIFY FLAG REG. 10 AS DATA TRANSFER DESTINATION BY USING DATA BUS 12 |

FIG. 7

| "src" FIELD VALUE(SYMBOL) | CONTENT |
|---|---|
| h'0(NON) | NOT SPECIFY DATA TRANSFER SOURCE BY USING DATA BUS 12 |
| h'1(AR) | SPECIFY DATA ADD. REG. 14 AS DATA TRANSFER SOURCE BY USING DATA BUS 12 |
| h'2(R0) | SPECIFY INPUT REG. R0 IN OPERATION EXECUTING UNIT 9 AS DATA TRANSFER SOURCE BY USING DATA BUS 12 |
| h'3(R1) | SPECIFY INPUT REG. R1 IN OPERATION EXECUTING UNIT 9 AS DATA TRANSFER SOURCE BY USING DATA BUS 12 |
| h'4(ACC) | SPECIFY ACCUMULATOR ACC IN OPERATION EXECUTING UNIT 9 AS DATA TRANSFER SOURCE BY USING DATA BUS 12 |
| h'5(MEM) | SPECIFY ADD. IN DATA MEMORY 13 SPECIFIED BY DATA ADD. REG. 14 AS DATA TRANSFER SOURCE BY USING DATA BUS 12 |
| h'6(LC) | SPECIFY LOOP COUNTER 6 AS DATA TRANSFER SOURCE BY USING DATA BUS 12 |
| h'7(FR) | SPECIFY FLAG REG. 10 AS DATA TRANSFER SOURCE BY USING DATA BUS 12 |

FIG. 8A

| "alu" FIELD VALUE(SYMBOL) | CONTENT |
|---|---|
| h'0 (NOP) | NO OPERATIONS ARE PERFORMED IN OPERATION EXECUTING UNIT 9 AND FLAG REG. 10 IS NOT CHANGED |
| h'1 (ADD) | VALUE OF X REG. AND VALUE OF Y REG. BOTH SPECIFIED BY "dy" FIELD ARE ADDED IN OPERATION EXECUTING UNIT 9. SUM IS STORED IN X REG. WHEN RESULT IS "0", Z FLAG(b1) OF FLAG REG. 10 IS SET ; WHEN CARRY IS GENERATED, C FLAG(b0) IS SET. |
| h'2 (SUB) | VALUE OF Y REG. SPECIFIED BY "dy" FIELD IS SUBTRACTED FROM VALUE OF X REG. SPECIFIED BY "dy" FIELD IN OPERATION EXECUTION UNIT 9, AND RESULT IS STORED IN X REG. WHEN RESULT IS "0", Z FLAG,(b1) OF FLAG REG. 10 IS SET ; WHEN BORROW IS GENERATED, C FLAG(b0) IS SET. |
| h'3 (ADC) | VALUE OF X REG. AND VALUE OF Y REG. BOTH SPECIFIED BY "dy" FIELD ARE ADDED IN OPERATION EXECUTING UNIT 9. WHEN C FLAG(b0) OF FLAG REG. 10 IS SET, "1" IS FURTHER ADDED. RESULT IS STORED IN X REG. WHEN RESULT IS "0", Z FLAG(b1) OF FLAG. 10 IS SET ; WHEN CARRY IS GENERATED, C FLAG(b0) IS SET. |

FIG. 8B

| "alu" FIELD VALUE(SYMBOL) | CONTENT |
|---|---|
| h'4 (SBC) | VALUE OF Y REG. SPECIFIED BY "dy" FIELD IS SUBTRACTED FROM VALUE OF X REG. SPECIFIED BY "dy" FIELD IN OPERATION EXECUTING UNIT 9. WHEN C FLAG(b0) OF FLAG REG. 10 IS SET, IT IS FURTHER DECREMENTED BY "1" AND RESULT IS STORED IN X REG. WHEN RESULT IS "0", Z FLAG(b1) OF FLAG REG. 10 IS SET ; WHEN BORROW IS GENERATED, C FLAG(b1) IS SET. |
| h'5 (CMPR) | VALUE OF X REG. SPECIFIED BY "dy" FIELD IS SUBTRACTED FROM VALUE OF Y REG. SPECIFIED BY "dy" FIELD IN OPERATION EXECUTING UNIT 9 ; AND RESULT IS REFLECTED ON FLAG. WHEN RESULT IS "0", Z FLAG REG. 10 IS SET ; WHEN BORROW IS GENERATED, C FLAG(b0) IS SET. |
| h'6 | RESERVED |
| h'7 | RESERVED |

FIG. 9

| "dy" FIELD VALUE(SYMBOL) | CONTENT |
|---|---|
| h'0(NON) | X REG. AND Y REG. ARE NOT SPECIFIED IN OPERATION EXECUTION |
| h'1(ACC) | ACCUMULATOR ACC IN OPERATION EXECUTING UNIT 9 IS SPECIFIED AS X REG. AND Y REG. IN OPERATION EXECUTION |
| h'2(R0) | ACCUMULATOR ACC IN OPERATION EXECUTING UNIT 9 IS SPECIFIED AS X REG. IN OPERATION EXECUTION, AND REG. R0 IN OPERATION EXECUTING UNIT 9 IS SPECIFIED AS Y REG. IN OPERATION EXECUTION |
| h'3(R1) | ACCUMULATOR ACC IN OPERATION EXECUTING UNIT 9 IS SPECFIED AS X REG. IN OPERATION EXECUTION, AND REG. R1 IN OPERATION EXECUTING UNIT 9 IS SPECIFIED AS Y REG. IN OPERATION EXECUTION |

FIG. 10

| 'ad' FIELD VALUE (SYMBOL) | CONTENT |
|---|---|
| h'0 (NON) | VALUE OF DATA ADD. REG. 14 IS NOT UPDATED |
| h'1 (INC) | VALUE OF DATA ADD. REG. 14 IS POST-INCREMENTED |
| h'2 (DEC) | VALUE OF DATA ADD. REG. 14 IS POST-DECREMENTED |
| h'3 | RESERVED |

FIG. 11

```
DATA_BASE  = (h'100)
DATA_LIMIT = (h'200)
LOOP_COUNT = (h'080)
MAX_VAL    = (h'3FF)

START_A:
    LOAD  (dst:AR,imm:DATA_BASE)
    LOAD  (dst:R0,imm:DATA_LIMIT)
    OP    (dst:R1,src:MEM,alu:SUB,dy:ACC,ad:INC)
    LOOP  (cond:C,imm:LOOP_COUNT)
    ENDLP (dst:MEM,src:ACC,alu:ADD,dy:R1)
    OP    (dst:R1,src:MEM,alu:CMPR,dy:R0,ad:INC)
    JMP   (cond:NX,imm:NEXT_A)
    LOAD  (dst:AR,imm:DATA_BASE)
    LOAD  (dst:ACC,imm:MAX_VAL)
    OP    (dst:MEM,src:ACC)

NEXT_A:
    ...
```

FIG. 13
PRIOR ART

```
DATA_BASE  = (h'100)
DATA_LIMIT = (h'200)
LOOP_COUNT = (h'080)
MAX_VAL    = (h'3FF)

START_B:
            LOAD    (dst:AR,imm:DATA_BASE)
            LOAD    (dst:R0,imm:DATA_LIMIT)
            OP      (alu:SUB,dy:ACC)
            OP      (dst:R1,src:MEM,ad:INC)
            LOOP    (cond:NON,imm:LOOP_COUNT)
             JMP    (cond:NC,imm:NEXT_LOOP_B)
             LOAD   (dst:LC,imm:h'001)
             JMP    (cond:ALL,imm:EXIT_LOOP_B)
NEXT_LOOP_B:
            OP      (dst:MEM,src:ACC)
            OP      (alu:ADD,dy:R1)
            OP      (dst:R1,src:MEM,ad:INC)
EXIT_LOOP_B:
            ENDLP()
            OP      (alu:CMPR,dy:R0)
            OP      (dst:ACC,s:LC)
            OP      (alu:ADD,dy:ACC)
            JMP     (cond:Z,imm:NEXT_B)
            LOAD    (dst:AR,imm:DATA_BASE)
            LOAD    (dst:ACC,imm:MAX_VAL)
            OP      (dst:MEM,src:ACC)
NEXT_B:
   ...
```

FIG. 14A PRIOR ART

```
START
  ↓
┌─────────────────────────────────────────────────┐
│ INITIAL ADD. VALUE (DATA_BASE=h'100) OF         │ S21
│ DATA MEMORY 13 IS SET IN DATA ADD. REG. 14.     │
│ DATA LIMIT VALUE (DATA_LIMIT=h'200) IS SET      │
│ IN INPUT REG. R0.                               │
│ VALUES OF ACCUMULATOR ACC ARE SUBTRACTED        │
│ FROM EACH OTHER TO BE ZERO-CLEARED. AND C       │
│ FLAG (b0) OF FLAG REG. 10 IS ALSO CLEARED.      │
│ DATA IS TRANSFERRED FROM DATA MEMORY 13 TO      │
│ INPUT REG. R1.                                  │
│ DATA ADD. REG. 14 IS INCREMENTED.               │
└─────────────────────────────────────────────────┘
  ↓
┌─────────────────────────────────────────────────┐
│ NUMBER OF LOOPS (LOOP_COUNT=h'080) IS SET       │ S22
│ IN LOOP COUNTER 6. AND LOOP TERMINATING         │
│ CONDITION IS NOT SATISFIED.                     │
│ LOOP START ADD. (h'002) IS HELD IN              │
│ INSTRUCTION ADD. STACK 5.                       │
└─────────────────────────────────────────────────┘
  ↓
(4)→ ◇ S23                          YES
     C FLAG (b0) OF FLAG  ──────────→ ┌──────────────────┐ S24
     REG. 10 IS SET?                  │ '1' IS SET IN LOOP│
         │ NO                         │ COUNTER 6         │
         ↓                            └──────────────────┘
┌─────────────────────────────────────────────────┐
│ VALUE OF ACCUMULATOR ACC IS TRANSFERRED         │ S25
│ TO ADD. OF DATA MEMORY 13 SPECIFIED BY DATA     │
│ ADD. REG. 14.                                   │
│ VALUE OF INPUT REG. R1 IS ADDED TO              │
│ ACCUMULATOR ACC. ADD.                           │
│ VALUE OF DATA MEMORY 13 SPECIFIED BY DATA       │
│ ADD. REG. 14 IS TRANSFERRED TO INPUT REG. R1.   │
│ VALUE OF DATA ADD. REG. 14 IS POST-             │
│ INCREMENTED.                                    │
└─────────────────────────────────────────────────┘
  ↓
 (3)
```

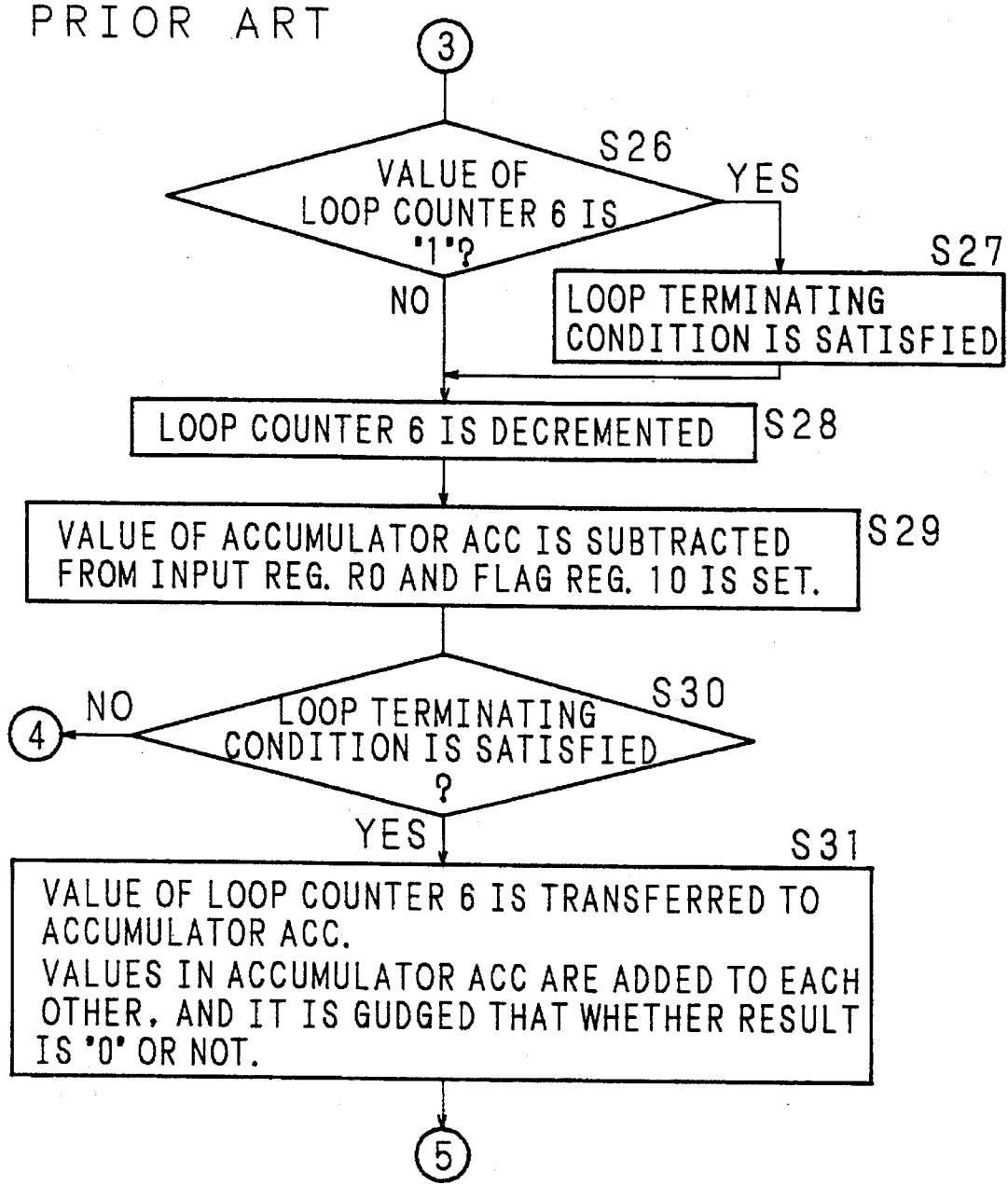

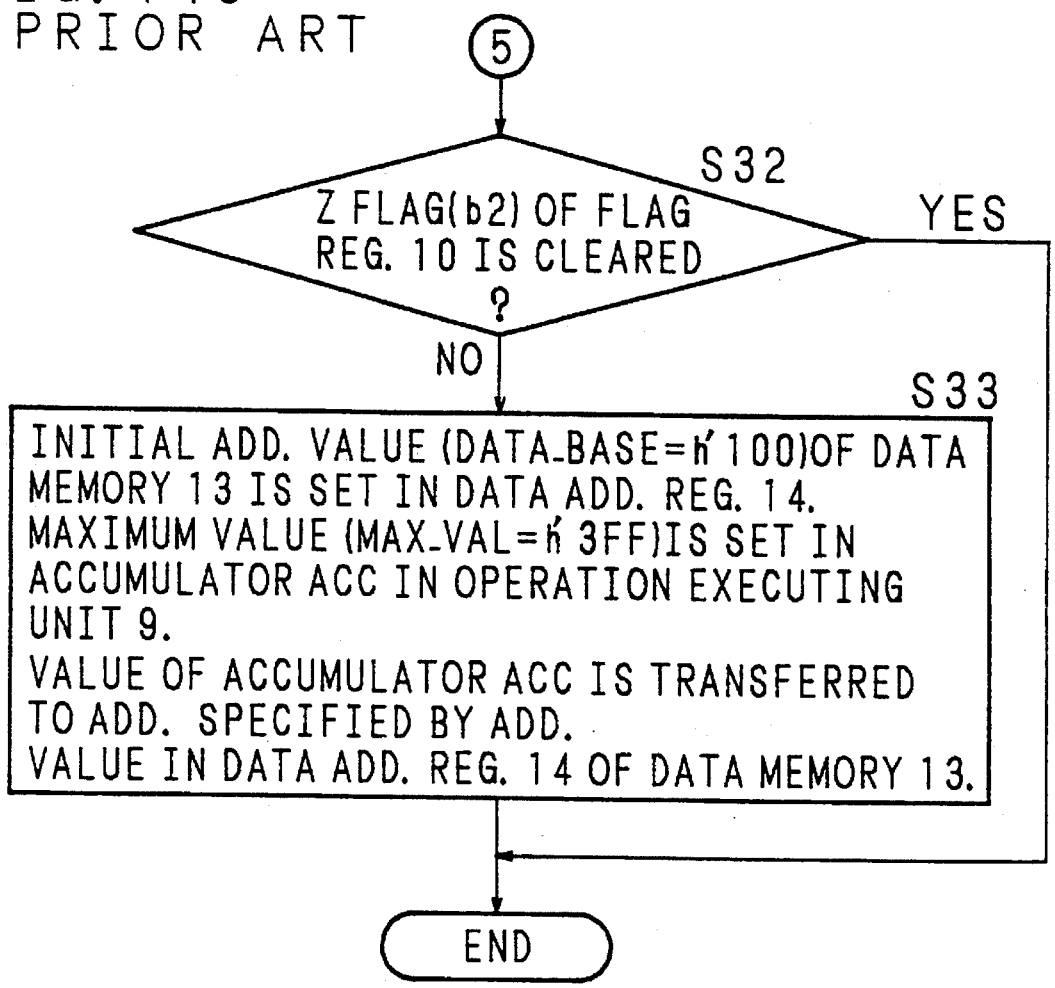

PIPELINE PROCESSOR WITH HARDWARE LOOP FUNCTION USING INSTRUCTION ADDRESS STACK FOR HOLDING CONTENT OF PROGRAM COUNTER AND RETURNING THE CONTENT BACK TO PROGRAM COUNTER

BACKGROUND OF INVENTION

1. Field of the Invention

The present invention is related to a pipeline processor, and more particularly to one having a hardware loop function with a terminating instruction which can terminate a loop processing by returning the content of a stack to a program counter according to the status indicated by a operation flag as well as a value of a loop counter during the loop processing.

2. Description of the Related Art

Processors of the prior art are constructed so that instructions are executed one by one, that is, only after completion of execution of one instruction, execution of the next instruction is started. In order to improve the efficiency of instruction execution of the processor of the prior art, the pipeline method was developed as one of the solutions and is now generally utilized.

In the pipeline method, the execution of one instruction is divided into several stages such as, for example, an "instruction fetch" stage, an "instruction decoding" stage and an "executing operation etc." stage. At the moment the execution of the instruction starts in the "executing operation etc." stage, decoding the next instruction starts in the "decoding" stage, and fetching the second next instruction starts in the "instruction fetch" stage; and thus the apparent execution efficiency improves, almost three times in this example.

The instructions comprising a program are usually stored in the instruction memory. When the program has a repetitive structure wherein a single instruction or several of them are respectively used, a loop program is made by using the conditional branch instructions in order to decrease the storage requirements in the instruction memory.

When an instruction sequence is accompanied by a branch, the operation result relating to the instruction having been already executed in the pipeline are invalidated and the instruction of a branch destination is fetched into the pipeline. In this case, the instruction execution efficiency is lowered. To cope with this problem, in case of simple repetitive processing of several instructions, the number of repetitive times of a loop instruction, a loop start address and a loop end address are held in the registers or the like by the loop start instruction, and the loop processing is controlled by hardware in parallel with the execution of the operations; in this way, the invalidation of the pipeline at the loop end including the branch is prevented. This technique is disclosed, for example, in "DSP56000 Digital Signal Processor User's Manual", pp. 7–20 through 7–21 published by Motorola.

Further, when the instruction sequence must escape the loop depending on the execution results of the operations in the loop as well as the simple repetitive processing, a loop escape instruction is provided. This technique is disclosed in the above papers, pp. A-71 and A-72.

However, abovementioned loop escape instruction is only used together with so called a conditional jump instruction, and the operations and data transfers cannot be done simultaneously with the loop escaping processing, therefore the data processing efficiency in the loop is lowered.

SUMMARY OF THE INVENTION

The present invention was developed to address the above stated circumstances and the object thereof is to provide a pipeline processor having a hardware loop function in which the loop processing can be terminated without lowering the data processing efficiency when so called a conditional jump instruction is executed during the loop processing, and the operations and data transfers can be performed simultaneously with the loop-escaping.

The pipeline processor having a hardware loop function related to the present invention comprises a transfer path through which a value of a flag register which is set according to a result of the operation execution is directly transferred to a loop control unit, and so configured that the loop control unit reads the value of the flag register and when it is proved to be a predetermined value, the loop processing is terminated.

The pipeline processor having a hardware loop function related to the present invention makes an operation executing unit perform operations and data transfers by a loop terminating instruction. In this case, the loop control unit reads the value of the flag register which is set before the operation execution by the operation executing unit.

Further, the pipeline processor having a hardware loop function related to the present invention has a data bus which transfers data by the loop terminating instruction.

Furthermore, the pipeline processor having a hardware loop function related to the present invention is so configured that content of the flag register may be selectively set according to whether content of an instruction address stack has been returned to a program counter or not when the loop terminating instruction is executed.

In the pipeline processor having a hardware loop function related to the present invention, the loop processing is terminated not only when the number of loop processings reaches the value set in a loop counter but also when the value set in the flag register according to the results of the operations is directly given to the loop control unit and the value is the predetermined one.

Further, in the pipeline processor having a hardware loop function related to the present invention, when the operation executing unit performs the predetermined operations and data transfers by the loop terminating instruction, the value of the flag register having been set before the operation execution by the operation executing unit is read into the loop control unit, and whether the loop processing should be terminated or not is determined.

Further, in the pipeline processor having a hardware loop function related to the present invention, data transfer is executed by the loop terminating instruction.

Furthermore, in the pipeline processor having a hardware loop function related to the present invention, when the loop terminating instruction is executed, the content of the flag register is selectively set according to whether the content of the instruction address stack has been returned to the program counter or not.

The above and further objects and features of the invention will more fully be apparent from the following detailed description with accompanying drawings.

BRIEF DESCRIPTION OF THE DRAWINGS

FIG. 2 s a list showing functions of bit positions of a flag register of an embodiment of the pipeline processor having a hardware loop function related to the present invention;

FIG. 3 is a list showing field arrangements for individual instructions of an embodiment of the pipeline processor having a hardware loop function related to the present invention;

FIG. 4 is a list showing functions of values and symbols of a "cond" field of individual instructions of an embodiment of the pipeline processor having a hardware loop function related to the present invention;

FIG. 5 is a list showing functions of values and symbols of an "imm" field of individual instructions of an embodiment of the pipeline processor having a hardware loop function related to the present invention;

FIG. 6 is a list showing functions of values and symbols of a "dst" field of individual instructions of an embodiment of the pipeline processor having a hardware loop function related to the present invention;

FIG. 7 is a list showing functions of values and symbols of an "src" field of individual instructions of an embodiment of the pipeline processor having a hardware loop function related to the present invention;

FIG. 8A and FIG. 8B are lists showing functions of values and symbols of an "alu" field of individual instructions of an embodiment of the pipeline processor having a hardware loop function related to the present invention;

FIG. 9 is a list showing functions of values and symbols of a "dy" field of individual instructions of an embodiment of the pipeline processor having a hardware loop function related to the present invention;

FIG. 10 is a list showing functions of values and symbols of an "ad" field of individual instructions of an embodiment of the pipeline processor having a hardware loop function related to the present invention;

FIG. 11 is a schematic diagram showing a program example for loop processing performed by an embodiment of the pipeline processor having a hardware loop function related to the present invention;

FIG. 13 is a schematic diagram showing a program example for loop processing performed by an example of a conventional pipeline processor having a hardware loop function; and FIG. 14A, 14B and 14C are schematic flowcharts showing the procedure of the loop processing performed by an example of a conventional pipeline processor having a hardware loop function.

DESCRIPTION OF THE PREFERRED EMBODIMENTS

The present invention is described with reference to the accompanying drawings showing the embodiments thereof.

Figure 1:
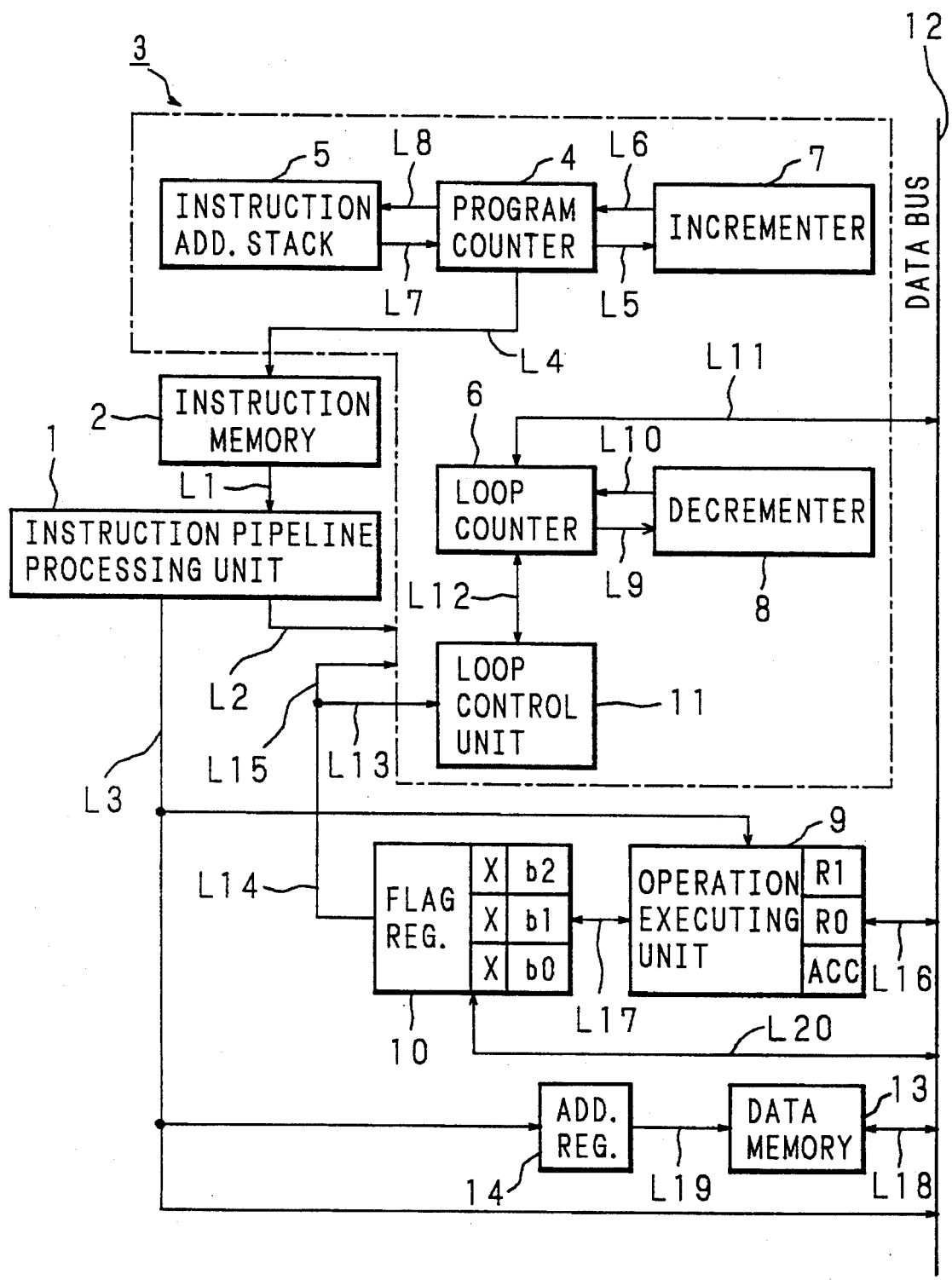
FIG. 1 is the block diagram showing a configuration example of an embodiment of the pipeline processor having a hardware loop function related to the present invention.

FIG. 1 is the block diagram showing a configuration example of an embodiment of the pipeline processor having a hardware loop function related to the present invention.

In FIG. 1, the reference numeral 1 denotes the instruction pipeline processing unit which comprises following three stages: an "instruction fetch" stage as an input stage, an "instruction decoding" stage as an output stage, and an "executing operation etc." stage for operation and the like in this embodiment.

An instruction code is inputted to the input stage of the instruction pipeline processing unit 1 from an instruction memory 2 via a signal line L1 every basic cycle. This operation is termed "instruction fetch38 . At the same time, the instruction which was fetched at the previous cycle is decoded, various control signals and immediate are generated, and they are supplied to an instruction sequence control unit 3 via a signal line L2.

The instruction sequence unit 3, upon receiving the control signals and immediates from the instruction pipeline processing unit 1, performs an instruction address control and a loop control. These operations are termed "instruction decoding". At the same time, the operation executing unit 9, upon receiving the control signals and immediates generated in "instruction decoding" at the previous cycle via a signal line L3, performs the operations and the like. These operations are termed "executing operation and the like (etc.)".

An instruction address specified by a program counter 4 in the instruction sequence control unit 3 is inputted to the instruction memory 2 via a signal line L4, and the instruction code, which is the content of the memory specified by the inputted address, is inputted supplied to the instruction pipeline processing unit 1 as stated above.

The instruction sequence control unit 3 comprises the program counter 4, an instruction address stack 5, a loop counter 6, an incrementer 7, a decrementer 8, a loop control unit 11, and the like. It performs instruction sequence control and loop control on the basis of various control signals and immediates commands generated by the "instruction decoding" in the instruction pipeline processing unit 1 and supplied via the signal line L2.

The program counter 4 outputs an address of the instruction in the instruction memory 2 to be fetched by the instruction pipeline processing unit 1 in the next cycle to the signal line L4. The value (the address in the instruction memory 2) held by the program counter 4 basically is supplied to the incrementer 7 every cycle via a signal line L5 and updated by "+1" (incremented) and then sent back to the program counter 4 via a signal line L6 and held again therein.

When the "instruction decoding" result by the instruction pipeline processing unit 1 indicates that an instruction to be executed is a "loop start" instruction or a "subroutine call" instruction, the instruction address stack 5 reads the content of the program counter 4 at that moment via a signal line L7 and holds it. When the "instruction decoding" result by the instruction pipeline processing unit 1 indicates that an instruction to be executed is a "subroutine return" instruction or a "loop terminating" instruction and when the loop terminating condition is not satisfied, the instruction address stack 5 outputs the value held in itself via the signal line L8 and makes the program counter 4 hold it. In this way, the value held in the program counter 4 is forcibly updated and thus the "instruction fetch" address, that is, the address of the instruction to be supplied next from the instruction memory 2 to the instruction pipeline processing unit 1 is updated.

The loop counter 6 holds the number of loops when the loop processing is performed by the hardware (hereafter, hardware loop). However, when the "loop terminating" instruction is executed, the value held in the loop counter 6 is supplied to the decrementer 8 via a signal line L9 at each time of execution of the instruction and updated by "−1" (decrements) and then sent back to it via a signal line L10 and held again therein.

The loop counter 6 is connected to a data bus 12 described later via a signal line L11 and to the loop control unit 11 via a signal line L12, and transfers data to/from them.

The incrementer 7 inputs the value held in the program counter 4 and updates it by "+1" (increments) and then sends it back to the program counter 4 to be held again therein. The decrementer 8 inputs the value held in the loop counter 6 and updates it by "−1" (decrements) and then sends it back to the loop counter 6 to be held therein.

The loop control unit 11 executes the control of the instruction sequence at the start and end of the hardware loop and the like. It is connected to the above stated loop counter 6 via the signal line L12 and to the flag register 10 described later via a signal line L13 and a signal line L14, and uses the values held therein to for a termination judgment of the loop processing.

Various control signals and immediates given from the instruction pipeline processing unit 1 to the instruction sequence control unit 3 via the signal line L2 are omitted in FIG. 1. However, they are supplied to the elements of the instruction sequence control unit 3.

The operation executing unit 9 comprises the input registers R1 and R0 which temporarily hold data to be inputted to the operation executing unit 9 and the accumulator ACC which temporarily holds the operation result. The operation executing unit 9 executes the instruction when the predetermined control signals are given from the instruction pipeline processing unit 1 via the signal line L3. That is, it inputs data from the data bus 12 via a signal line L16 according to the control signals given from the instruction pipeline processing unit 1, performs the operations by using registers built therein, outputs the operation result to the data bus 12 via the signal line L16, and outputs the signals, if necessary, via the signal line L17 in order to selectively set a value into the flag register 10.

The flag register 10 has three bits, that is, second through 0th. values of these bits (X flag, Z flag and C flag) can be set by a "LOAD" (immediate set)" instruction described later or the like via the data bus 12 and a signal line L20 as well as selectively set according to the results of the operations execution by the operation executing unit as shown in FIG. 2.

The bit 2 (symbol X) of the flag register 10 is set when loop-escaping is performed in response to the results of the operation execution by the operation executing unit 9. The bit 1 (symbol Z) is set when the results of the operation execution by the operation executing unit 9 is "0" and cleared in the other cases. The bit 0 (symbol C) is set when a carry or borrow is generated in response to the results of the operation execution by the operation executing unit 9 and cleared in the other cases.

The value of each bit of the flag register 10 is sent to the instruction sequence control unit 3 via the signal lines L14 and L15 as well as directly to the loop control unit 11 via the signal lines L14 and L13. This fact characterizes the pipeline processor having a hardware loop function related to the present invention in the hardware.

The reference numeral 13 denotes a data memory. It holds the data to be supplied to the operation executing unit 9 and the results of the operations execution by the operation executing unit 9. It inputs/outputs data and results of the operation execution from/to the data bus 12 via a signal line L18.

The reference numeral 14 denotes the data address register. When using the data stored in the data memory 13 or when storing data therein, the data address register 14 temporarily holds the data address outputted from the instruction pipeline processing unit 1 to the signal line L3 and then supplied it to the data memory 13 via the signal line L19. Further, the data address register 14 can perform address modification such as post-incremented and post-decremented.

The reference numeral 12 denotes the data bus as described above. It is connected to the instruction pipeline processing unit 1, the data memory 13, the flag register 10, the operation executing unit 9 and the loop counter 6, and transfers data between them.

The operations performed by the pipeline processor having a hardware loop function related to the present invention are explained as follows.

The pipeline processor having a hardware loop function related to the present invention, in this embodiment, the instruction word is 16-bit length and the data word is 10-bit length and adopts the Harvard architecture wherein the 1K-word instruction space and the 1K-word data space are separated from each other. Further, the instructions are executed by the three-stage pipeline processing constituted by the "instruction fetch" stage, the "instruction decoding" stage and the "executing operation etc." stage.

The instruction fetched from the instruction memory 2 by the "instruction fetch" stage of the instruction pipeline processing unit 1 is decoded by the "instruction decoding" stage according to the instruction format shown in FIG. 3.

FIG. 3 is the schematic diagram showing the field allocation for the symbol names of the instruction. Eight types of instructions are distinguished from each other by the three bits, that is, bit 15, bit 14 and bit 13 in this embodiment.

When the bit 15, bit 14 and bit 13 are "000" it means the "NOP (no operation)" instruction. The "NOP" instruction does nothing in the "instruction decoding" stage and the "executing operation etc." stage.

When the bit 15, bit 14 and bit 13 are "001" it means a JMP instruction. The bit 12, bit 11 and bit 10 of the JMP instruction are allocated as a "cond" field and the bit 9 through bit 0 are allocated as an "imm" field.

At the moment the condition defined in the "cond" field is satisfied in the "instruction decoding" stage, the JMP instruction invalidates the instruction which has been fetched into the "instruction fetch" stage, that is, forcibly changes to the "NOP" instruction and sets the immediate data of the "imm" field into the program counter 4. However, the "JMP" instruction does nothing in the "executing operation etc." stage.

When the bit 15, bit 14 and bit 13 are "010" it means the "CALL ( subroutine call )" instruction. The bit 12, bit 11 and bit 10 of the "CALL" instruction are allocated as the "cond" field and the bit 9 through bit 0 thereof are allocated as the "imm" field.

When the condition defined in the "cond" field is satisfied, the "CALL" instruction invalidates the instruction which has been fetched into the "instruction fetch" stage (forcibly changes to the "NOP" instruction), makes the instruction address stack 5 hold the value of the program counter 4, and sets the immediate data of the "imm" field into the program counter 4. However, the "CALL" instruction does nothing in the "executing operation etc." stage.

When the bit 15, bit 14 and bit 13 are "011", it means the "LOOP (loop start)" instruction. The bit 12, bit 11 and bit 10 of the "LOOP" instruction are allocated as the "cond" field and the bit 9 through bit 0 thereof are allocated as the "imm" field.

The "LOOP" instruction sets the condition of the "cond" field into the loop control unit 11 in the "instruction decoding" stage, makes the instruction address stack 5 hold the value of the program counter 4, and sets the immediate data of the "imm" field into the loop counter 6. However, the "LOOP" instruction does nothing in the "executing operation etc." stage.

When the bit 15, bit 14 and bit 13 are "100", it means the "LOAD (immediate value set)" instruction. The bit 12, bit 11 and bit 10 of the "LOAD" instruction are allocated as the "dst (destination)" field and the bit 9 through bit 0 thereof are allocated as the "imm" field.

The "LOAD" instruction does nothing in the "instruction decoding" stage. However, it sets the immediate data of the "imm" field into the register or the like specified by the "dst" field in the "executing operation etc." stage.

When the bit 15, bit 14 and and bit 13 are "101", it means the "OP (operation)" instruction. The bit 12, bit 11 and bit 10 of the "OP instruction" are allocated as the "dst" field. The bit 9, bit 8 and 7 thereof are allocated as the "src source)" field. The bit 6, bit 5 and bit 4 thereof are allocated as the "alu (operation)" field. The bit 3 and bit 2 thereof are allocated as the "dy (flag register)" field. The bit 1 and bit 0 thereof are allocated as the "ad (address)" field.

The "OP" instruction does nothing in the "instruction decoding" stage. However, it transfers the value of the register or the like specified by the "src" field to the register or the like specified by the "dst" field via the data bus 12 in the "executing operation etc." stage, performs the operations specified by the "alu" field with respect to the register specified by the "dy" field in the operation executing unit 9, and executes updating specified by the "ad" field with respect to the data address register 14.

When the bit 15, bit 14 and bit 13 are "110", it means the "RET (subroutine return)" instruction. The bit 12, bit 11 and bit 10 of the "RET" instruction are allocated as the "dst" field. The bit 9, bit 8 and bit 7 thereof are allocated as the "src" field. The bit 6, bit 5 and bit 4 thereof are allocated as the "alu" field. The bit 3 and bit 2 thereof are allocated as the "dy" field. The bit 1 and bit 0 thereof are allocated as the "ad" field.

The "RET" instruction sets the value of the instruction address stack 5 into the program counter 4 in the "instruction decoding" stage. It does not invalidate the instruction which has been fetched into the "instruction fetch" stage of the instruction pipeline processing unit 1 but executes it after the "RET" instruction itself is executed; it is a delayed execution instruction. Further, it performs the same operations as the "OP" instruction in the "executing operation etc." stage.

When the bit 15, bit 14 and bit 13 are "111", it means the "ENDLP (loop terminating)" instruction. The bit 12, bit 11 and bit 10 of the "ENDLP" instruction are allocated as "dst" field. The bit 9, bit 8 and bit 7 thereof are allocated as the "src" field. The bit 6, bit 5 and bit 4 thereof are allocated as the "alu" field. The bit 3 and bit 2 thereof are allocated as the "dy" field. The bit 1 and bit 0 thereof are allocated as the "ad" field.

When the value of the loop counter 6 is not "1" in the "instruction decoding" stage and the value of the flag register 10 does not satisfy the condition of the "cond" field which is set in the loop control unit 11 by the "LOOP" instruction, the "ENDLP" instruction sets the value of the instruction address stack 5 into the program counter 4. The "ENDLP" instruction does not invalidate the instruction which has been fetched into the "instruction fetch" stage of the instruction pipeline processing unit 1 but executes it after the execution of the "ENDLP" instruction itself; it is a delayed execution instruction. Further, it performs the same operations as the "OP" instruction and decrements the value of the loop counter 6 by the decrementer 8 in the "executing operation etc." stage.

FIG. 4 through FIG. 10 are lists showing the operations performed by the pipeline processor having a hardware loop function related to the present invention with respect to each value and each symbol of each field of each instruction shown in FIG. 3.

FIG. 4 is a list showing the operations for the values of the "cond" field (bit 12, bit 11 and bit 10). It specifies the judgment condition for the flag register 10.

Concretely, when the value of the "cond" field expressed by hexadecimal notation (h') is "0 (symbol is NON)" or "1 (symbol is ALL)", the condition is always satisfied s are satisfied; when it is "2 (symbol is NC)", the condition is satisfied in case where the C flag (b0) of the flag register 10 is cleared; when it is "3 (symbol is C)", the condition is satisfied in case where the C flag (b0) of the flag register 10 is set; when it is "4 (symbol is NZ)", the condition is satisfied in case where the Z flag (b1) of the flag register 10 is cleared; when it is "5 (symbol is Z)", the condition is satisfied in case where the Z flag (b1) of the flag register 10 is set; when it is "6 (symbol is NX)", the condition is satisfied in case where the X flag (b2) of the flag register 10 is cleared; and when it is "7 (symbol is X)", the condition is satisfied in case where the X flag (b2) of the flag register 10 is set.

FIG. 5 is a list showing the operations performed for the values of the "imm" field (bit 9 through bit 0). It specifies the immediate to be set in the register or the like.

Concretely, when the value of the "imm" field expressed by hexadecimal notation (h') is "0" through "3FF", the immediate in this range is specified to be set in the program counter 4, the loop counter 6 or the like.

FIG. 6 is a list showing the operations performed for the values of the "dst" field (bit 12, bit 11 and bit 10). It specifies the transfer destination for the data transfer processing via the data bus 12.

Concretely, when the value of the "dst" field expressed by hexadecimal notation (h') is "0 (symbol is NON)", the transfer destination of data using the data bus 12 is not specified. When the value of the "dst" field expressed by hexadecimal notation (h') is "1 (symbol is AR)", the data address register 14 is specified as the transfer destination of the data via the data bus 12; when it is "2 (symbol is R0)", the input register R0 in the operation executing unit 9 is specified as the same; when it is "3 (symbol is R1)", the input register R1 in the operation executing unit 9 is specified as the same; when it is "4 (symbol is ACC)", the accumulator ACC in the operation executing unit 9 is specified as the same; when it is "5 (symbol is MEM)", the address in the data memory 13 specified by the data address register 14 is specified as the same; when it is "6 (symbol is LC)", the loop counter 6 is specified as the same; and when it is "7 (symbol is FR)", the flag register 10 is specified as the same.

FIG. 7 is a list showing the operations performed for the values of the "src" field (bit 9 through bit 7). It specifies the data transfer source via the data bus 12.

Concretely, when the value of the "src" field expressed by hexadecimal notation (h') is "0 (symbol is NON)", the data transfer source via the data bus 12 is not specified. When the value of the "src" field expressed by hexadecimal notation (h') is "1 (symbol is AR)", the data address register 14 is specified as the data transfer source via the data bus 12; when it is "2 (symbol is R0)", the input register R0 in the operation executing unit 9 is specified as the same; when it is "3 (symbol is R1)", the input register R1 in the operation executing unit 9 is specified as the same; when it is "4 (symbol is ACC)", the accumulator ACC in the operation executing unit 9 is specified as the same; when it is "5 (symbol is MEM)", the address in the data memory 13 specified by the data address register 14 is specified as same; when it is "6 (symbol is LC)", the loop counter 6 is specified as the same; and when it is "7 (symbol is FR)", the flag register 10 is specified as the same.

FIG. 8 is a list showing the operations for the values of the "alu" field (bit 6 through bit 4). It specifies the types the operations to be executed in the operation executing unit 9. Concretely, the following operations are performed.

When the value of the "alu" field expressed by hexadecimal notation (h') is "0 (symbol is NOP)", no operations are performed in the operation executing unit 9 and the flag register 10 is not changed.

When the value of the "alu" field expressed by hexadecimal notation (h') is "1 (symbol is ADD)", the value of the X register and the value of the Y register both specified by the "dy" field are added in the operation executing unit 9, and the sum is stored in the X register. When the addition result is "0", the Z flag (b1) of the flag register 10 is set; when a carry is generated, the C flag (b0) is set.

When the value of the "alu" field expressed by hexadecimal notation (h') is "2 (symbol is SUB)", the value of the Y register specified by the "dy" field is subtracted from the value of the X register specified by the "dy" field in the operation executing unit 9 and the subtraction result is stored in the X register. When the subtraction result is "0", the Z flag (b1) of the flag register 10 is set; when a borrow is generated, the C flag (b0) is set.

When the value of the "alu" field expressed by hexadecimal notation (h') is "3 (symbol is ADC)", the value of the X register and the value of the Y register both specified by the "dy" field are added in tile operation executing unit 9. When the C flag (b0) of the flag register 10 is set, "1" is further added. The addition result is stored in the X register. When the addition result is "0", the Z flag (b1) of the flag register 10 is set; when a carry is generated, the C flag (b0) is set.

When the value of the "alu" field expressed by hexadecimal notation (h') is "4 (symbol is SBC)", the value of the Y register specified by the "dy" field is subtracted from the value of the X register specified by the "dy" field in the operation executing unit 9. When the C flag (b0) of the flag register 10 is set, it is further decremented by "1" and the subtraction result is stored in the X register. When the subtraction result is "0", the Z flag (b1) of the flag register 10 is set; when a borrow is generated, the C flag (b0) is set.

When the value of the "alu" field expressed by hexadecimal notation (h') is "5 (symbol is CMPR)", the value of the X register specified by the "dy" field is subtracted from the value of the Y register specified by the "dy" field in the operation executing unit 9; and the result is reflected on the flag. When the subtraction result it is "0", the Z flag (b1) of the flag register 10 is set; when a borrow is generated, the C flag (b0) is set.

When the value of the "alu" field expressed by hexadecimal notation (h') is "6" and "7", it is reserved.

FIG. 9 is a list showing the operations performed for the values of the "dy" field (bit 3 and bit 2). It specifies the input/output registers used for the operation execution in the operation executing unit 9.

Concretely, when the value of the "dy" field expressed by hexadecimal notation (h') is "0 (symbol is NON)", the X and Y registers in operation execution are not specified. When it is "1 (symbol is ACC)", the values of the accumulator ACC in the operation executing unit 9 is specified as those of the X and Y registers in operation execution. When it is "2 (symbol is R0)", the value of the accumulator ACC in the operation executing unit 9 is specified as that of the X register in operation execution and the value of the input register R0 in the operation executing unit 9 is specified as the value of the Y register in operation execution. When it is "3 (symbol is R1)", the value of the accumulator ACC in the operation executing unit 9 is specified as that of the X register in operation execution and the value of the input register R1 in the operation executing unit 9 is specified as that of the Y register in operation execution.

FIG. 10 is a list showing the operations performed for the values of the "ad" field (bit 1 and bit 0). It specifies address updating operations of the data address register 14.

When the value of the "ad" field expressed by hexadecimal notation (h') is "0 (symbol is NON)", the value of the data address register 14 is not updated. When it is "1 (symbol is INC)", the value of the data address register 14 is post-incremented. When it is "2 (symbol is DEC)", the value of the data address register 14 is post-decremented.

When the value of the "ad" field expressed by hexadecimal notation (h') is "3", it is reserved.

Figure 12A:
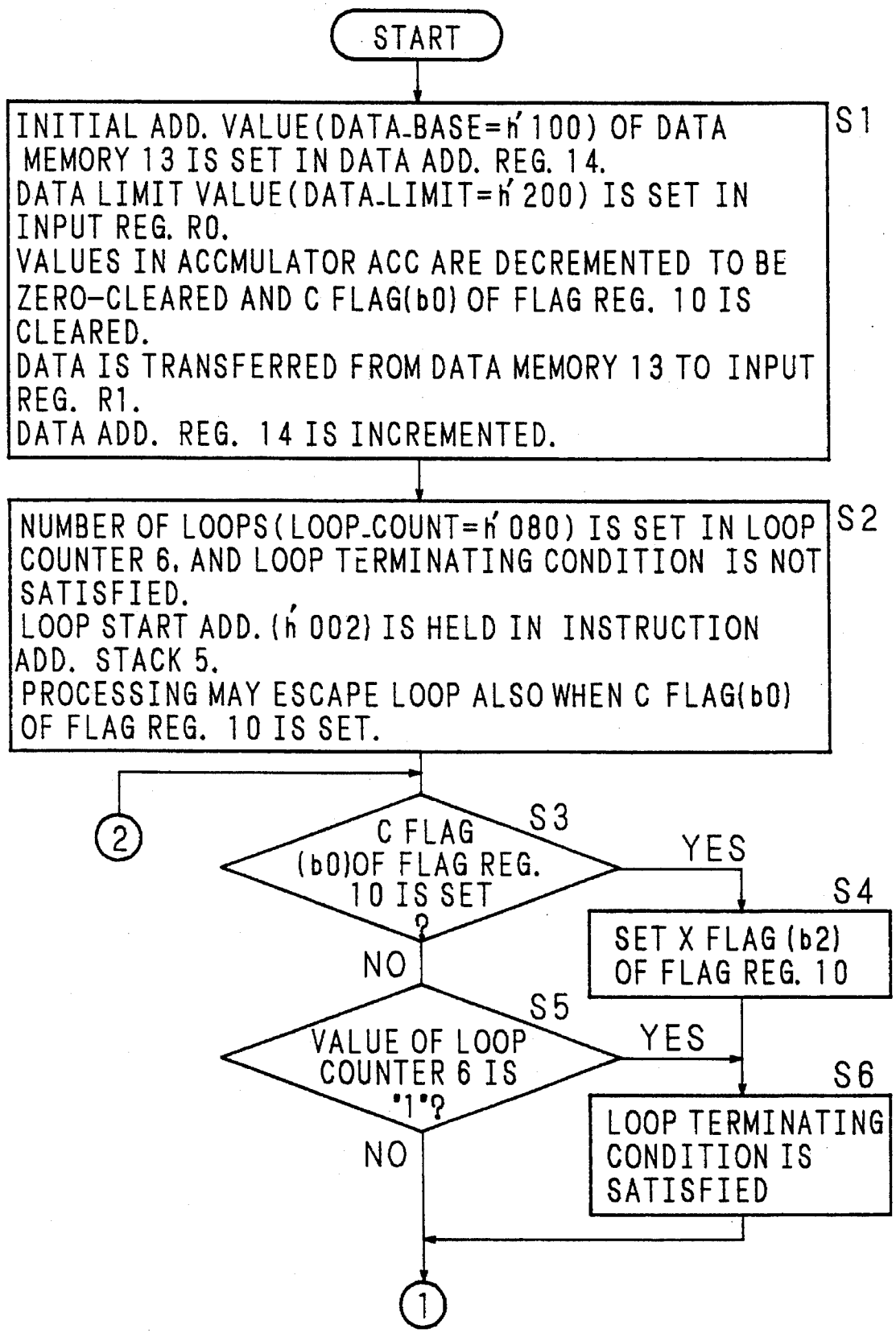
FIG. 12A and FIG. 12B are schematic flowcharts showing the procedure of the loop processing performed by an embodiment of the pipeline processor having a hardware loop function related to the present invention.
Figure 12B:
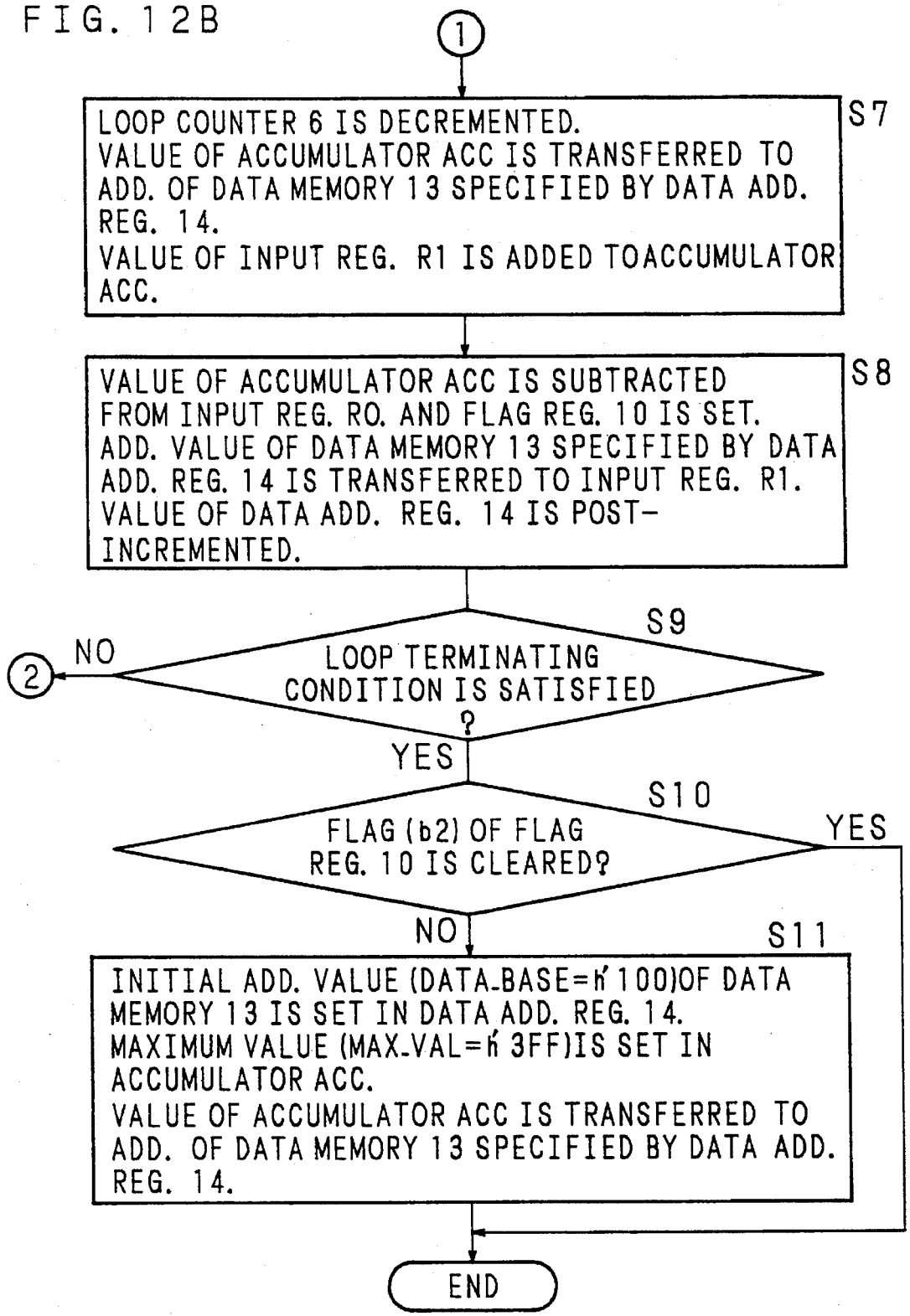

An example of a program to be executed by the pipeline processor having a hardware loop function related to the present invention in which several operations are repeatedly executed by a loop and terminates the loop processing not only by the number of loops but also by the results of the operation execution is shown in FIG. 11. FIG. 12A and FIG. 12B are the flowcharts showing the procedure when the pipeline processor having a hardware loop function related to the present invention executes the program shown in FIG. 11.

FIG. 13 shows a program example executed by the conventional pipeline processor when it executes processings as same as abovementioned program shown in FIG. 11 executed by the pipeline processor having a hardware loop function related to the invention. FIG. 14A, FIG. 14B and FIG. 14C are the flow-charts showing the procedure when the conventional pipeline processor executes the program shown in FIG. 13.

The outline of the operations of the program shown in FIG. 11 and FIG. 13 are as follows. Data strings sequentially stored in the data memory 13 are accumulated and the result of each accumulation is returned to the data memory 13. When the accumulated result exceed the limit, the maximum value (h'3FF) is written at the head of the data strings returned to the data memory 13 for distinction. When the accumulating processings terminate without exceeding the limit, zero (h'000) is written at the head thereof.

The program shown in FIG. 11 is described in the assembly language. One line corresponds to one processing unit, and distinguished pseudo instructions and the ordinary instructions are distinguished from each other; and the blank lines are ignored. The pseudo instruction has the symbol setting line separated by the equal signs (=) and the label setting line terminated by the colon (:).

In the symbol setting line, the contents in the parentheses on the right side of the equal sign are assigned to the symbol placed on the left side thereof. The numeric value is specified by the 3-digit hexadecimal number following the symbol (h') indicating the hexadecimal notation. On the other hand, in the label setting line, the instruction address location is assigned to the symbol placed on the left side of the colon. The symbol can be used for the "imm" field for the jump instruction.

The instruction setting line begins with the instruction symbol (NOP, JMP, CALL, LOOP, LOAD, OP, RET, ENDLP) as shown in FIG. 3, and the field which can be specified by each instruction is described in the parentheses. A field which is set by the field symbol (cond, imm, dst, src, alu, dy, ad) shown in FIG. 3 is specified on the left side of the colon, and a numeric value or a symbol corresponding to the numeric value shown in FIG. 4 through FIG. 10 is specified on the right side thereof. Each field specification is separated by commas ","; and when nothing is specified in the field, it is regarded that "0" is specified.

The program shown in FIG. 11 run by the pipeline processor having a hardware loop function related to the present invention is explained as follows in relation to the steps of the flowcharts illustrated in FIG. 12A and FIG. 12B. The execution cycle is expressed by the throughput in case the pipeline operations are performed.

The first three instructions given below in FIG. 11 correspond to the step S1 shown in FIG. 12A. Three cycles are necessary for executing these three instructions.

LOAD (dst:AR, imm:DATA_BASE)

LOAD (dst:R0, imm:DATA_LIMIT)

OP (dst:R1, src:MEM, alu:SUB, dy:ACC, ad:INC)

Concretely, the following processings are performed. At first, an initial address value (DATA_BASE=h'100) of the data memory 13 which is assigned by the symbol setting line is set in the data address register 14. Next, a data limit value (DATA_LIMIT=h'200) which is assigned by the symbol setting line is set in the input register R0 in the operation executing unit 9. Then, the values in the accumulator ACC in the operation executing unit 9 are decremented to be zero-cleared and the C flag (b0) of the flag register 10 is cleared. Further, data is transferred from the data memory 13 to the input register R1 in the operation executing unit 9 via the signal line L18, the data bus 12 and the signal line L16, and the data address register 14 is incremented.

The instruction given below in FIG. 11 corresponds to the step S2 shown in FIG. 12A. One cycle is necessary for executing the instruction. The loop terminating condition is that the value of the loop counter 6 is "1" or the C flag (b0) of the flag register 10 is set in the loop terminating instruction.

LOOP (cond:C, imm:LOOP_COUNT)

Concretely, the following processings are performed. At first, the number of loops (LOOP_COUNT=h'080) assigned by the symbol setting line is set in the loop counter 6. Then, the loop start address, which is the value (h'002) of the program counter 4 at the moment, is sent to the instruction address stack 5 via the signal line L7 and held therein, and the loop terminating condition is set in the loop control unit 11 so that the processing may escape the loop also when the C flag (b0) of the flag register 10 is set.

The instruction given below in FIG. 11 corresponds to the step S3 to step S7 and S9 in FIG. 12A and FIG. 12B. One cycle is necessary for executing the instruction. It is a delayed instruction which always executes the next instruction.

ENDLP (dst:MEM, src:ACC, alu:ADD, dy:R1)

Concretely, the following processings are performed. Whether the value of the C flag (b0) of the flag register 10 is read by the loop control unit 11 via the signal lines L14 and L13 and set or not is checked (step S3). When it is set, the X flag (b2) of the flag register 10 is set (step S4) and the loop terminating condition is satisfied (step S6); when it is not set, the value of the loop counter 6 is read by the loop control unit 11 via the signal line L12 and checked (step S5). When the value of the loop counter 6 is "1", the loop terminating condition is satisfied in the above step S6; when it is other than "1", the value of the loop counter 6 is decremented. Further, the value of the accumulator ACC in the operation executing unit 9 is transferred to the address of the data memory 13 specified by the data address register 14 via the signal line L16, the data bus 12 and the signal line L18, and the value of the input register R1 is added to the accumulator ACC (step S7).

The instruction given below in FIG. 11 corresponds to the step S8 in FIG. 12B.

OP (dst:R1, src:MEM, alu:CMPR, dy:R0, ad:INC)

Concretely, the following processings are performed. The value of the accumulator ACC is subtracted from the input register R0 in the operation executing unit 9, and the flag register 10 is set. Then, the address value of the data memory 13 specified by the data address register 14 is transferred to the input register R1 in the operation executing unit 9 via the signal line L18, the data bus 12 and the signal line L16, and the value of the data address register 14 is post-incremented.

Consequently, in the pipeline processor having a hardware loop function of the present invention, there are only two instructions in the loop and two cycles are necessary as the numbers of the execution cycle per loop.

In addition, following the step S8, whether the loop terminating condition is satisfied or not in the above stated step S6 is judged (step S9). When it is not satisfied, processing is returned to the step S3 and the processings up to the step S8 are repeated.

The instruction given below in FIG. 11 corresponds to the step S10 in FIG. 12B. One or two cycles are necessary for executing the instruction. Whether processing has escaped the loop by the results of the operation execution before the value of the loop counter 6 becomes "1" by executing only the instruction or not can be judged.

JMP (cond:NX, imm:NEXT_A)

Concretely, the following processings are performed. Whether the X flag (b2) of the flag register 10 is cleared or not is judged. When it is cleared, the processing is terminated.

The following three instructions in FIG. 11 correspond to the step S11 in FIG. 12B. Three cycles are necessary for executing these instructions.

LOAD (dst:AR, imm:DATA_BASE)

LOAD (dst:ACC, imm:MAX_VAL)

OP (dst:MEM, src:ACC)

Concretely, the following processings are performed. At first, the initial address value (DATA_BASE=h'100) of the data memory 13 assigned by the symbol setting line is set in the data address register 14. Next, the maximum value (MAX_VAL=h'3FF) assigned by the symbol setting line is set in the accumulator ACC in the operation executing unit 9. Then, the value of the accumulator ACC in the operation executing unit 9 is transferred to the address of the data memory 13 specified by the data address register 14 via the signal lines L16, the data bus 12 and the signal line LiB.

The program shown in FIG. 13 executed by the conventional pipeline processor is explained as follows in relation to the steps in the flow-charts shown in FIG. 14A, FIG. 14B and FIG. 14C. The execution cycle is expressed by the throughput in case the pipeline processing is performed.

Note that the conventional pipeline processor wherein the program shown in FIG. 13 is executed does not comprises the signal line L13 in the configuration example of the pipeline processor having a hardware loop function related to the present invention shown in FIG. 1. Therefore, the signals cannot be directly transferred from the flag register 10 to the loop control unit 11.

The following first four instructions shown in FIG. 13 correspond to the step S21 in FIG. 14A. Four cycles are necessary for executing these instructions.

LOAD (dst:AR, imm:DATA_BASE)

LOAD (dst:R0, imm:DATA_LIMIT)

OP (alu:SUB, dy:ACC)

OP (dst:R1, src:MEM, ad:INC)

Concretely, the following processings are performed. At first, the initial address value (DATA_BASE=h'100) of the data memory 13 assigned by the symbol setting line is set in the data address register 14. Next, the data limit value (DATA_LIMIT=h'200) assigned by the symbol setting line is set in the input register R0 in the operation executing unit 9. Then, the values of the accumulator ACC in the operation executing unit 9 are subtracted from each other to be zero-cleared, and the C flag (b0) of the flag register 10 is also cleared. Further, data is transferred from the data memory 13 to the input register R1 in the operation executing unit 9 via the signal lines L18, the data bus 12 and the signal line L16, and the data address register 14 is incremented.

The instruction given below in FIG. 13 corresponds to the step S22 in FIG. 14A. One cycle is necessary for executing the instruction. The loop terminating condition is that the value of the loop counter 6 is "1" in the loop terminating instruction.

LOOP (cond:NON, imm:LOOP_COUNT)

Concretely the following processings are performed. The number of loops (LOOP_COUNT=h'080) assigned by the symbol setting line is set in the loop counter 6. Then, the loop start address, which is the value (h'002) of the program counter 4 at the moment is sent to the instruction address stack 5 via the signal line L7 and held therein.

The following three instructions shown in FIG. 13 correspond to the steps S23 and S24 in FIG. 14A. For executing these instructions, one more cycle is necessary to invalidate the next instruction when executing a jump instruction. Consequently, two cycles are necessary because the first "jump" instruction is executed when continuing the loop processing and four cycles are necessary when control escapes the loop by the results of the operation because the next jump instruction is also executed.

JMP (cond:NC, imm:NEXT_LOOP_B)

LOAD (dst:LC, imm:h'001)

JMP (cond:ALL, imm:EXIT_LOOP_B)

Concretely the following processings are performed. Whether the C flag (b0) of the flag register 10 is read by the loop control unit 11 via the signal lines L14 and L15 and set or not is checked (step S23). When it is set, 1 is set to the loop counter 6 via the signal line L12 (step S24).

The following three instructions in FIG. 13 correspond to the step S25 in FIG. 14A. Three cycles are necessary for executing these instructions. They are necessary because the operations and data transfers cannot be done in parallel with the "loop terminating" instruction.

OP (dst:MEM, src:ACC)

OP (alu:ADD, dy:R1)

OP (dst:R1, src:MEM, ad:INC)

Concretely, the following processings are performed. The value of the accumulator ACC in the operation executing unit 9 is transferred to the address of the data memory 13 specified by the data address register 14 via the signal line L16, the data bus 12 and the signal line L18, and the value of the input register R1 is added to the accumulator ACC (step S7). Then, the address value of the data memory 13 specified by the data address register 14 is transferred to the input register R1 in the operation executing unit 9 via the signal line L18, the data bus 12 and the signal line L16, and the value of the data address register 14 is postincremented.

The instruction given below in FIG. 13 corresponds to the steps S26, S28 and S30 in FIG. 14B. One cycle is necessary for executing the instruction. It always executes the next instruction, that is, it is a delayed execution instruction.

ENDLP ( )

Concretely, the following processing are performed. The value of the loop counter 6 is read out by the loop control unit 11 via the signal line L12 and checked (step S26). When it is "1", the loop terminating condition is satisfied (step S27). When it is other than "1", the value of the loop counter 6 is decremented (step S28).

The instruction given below in FIG. 13 corresponds to the step S29 in FIG. 14B. One cycle is necessary for executing this instruction.

OP (alu:CMPR, dy:R0)

Concretely, the following processings are performed. The value of the accumulator ACC is subtracted from the input register R0 in the operation executing unit 9 and the flag register 10 is set.

As stated above, in the conventional pipeline processor there are eight instructions in the loop and the number of execution cycles per loop is five to seven. Consequently, the conventional pipeline processor needs twice or more execution cycles than those necessary for the pipeline processor having a hardware loop function related to the present invention as shown by the program and flowcharts in FIG. 11, FIG. 12A and FIG. 12B.

Whether the loop terminating condition was satisfied or not in the above stated step S27 is judged following the step S29 (step S30). Unless it is satisfied, processing is returned to the step S23 and the operations up to the step S29 are repeated.

The following three instructions shown in FIG. 13 correspond to the steps S31 and S32 in FIG. 14C. Three to four cycles are necessary to judge whether processing has escaped the loop by the results of the operation execution or not before the value of the loop counter 6 becomes "1".

OP (dst:ACC, s:LC)

```
OP (alu:ADD, dy:ACC)

JMP (cond:Z, imm:NEXT_B)
```

Concretely, the following processings are performed. The value of the loop counter 6 is transferred to the accumulator ACC in the operation executing unit 9 via the signal line L11, the data bus 12 and the line L16 (step S31), the values in the accumulator ACC are added to each other, and whether it is judged that addition result is "0" or not is determined. Then, whether the Z flag (b1) of the flag register 10 is set or not is judged (step S32).

The following three instructions shown in FIG. 13 correspond to the step S33 in FIG. 14C. Three cycles are necessary to execute these instructions.

```
LOAD (dst:AR, imm:DATA_BASE)

LOAD (dst:ACC, imm:MAX_VAL)

OP (dst:MEM, src:ACC)
```

Concretely, the following processings are performed. At first, the initial address value (DATA BASE=h'100) of the data memory 13 assigned by the symbol setting line is set in the data address register 14 via the signal line L3. Next, the maximum value (MAX_VAL=h'3FF) assigned by the symbol setting line is set in the accumulator ACC in the operation executing unit 9 via the signal line L13, the data bus 12 and the signal line L16. Then, the value of the accumulator ACC in the operation executing unit 9 is transferred to the address specified by the address value in the data address register 14 of the data memory 13 via the signal line L16, the data bus 12 and the signal line L18.

When the program and flowcharts for the pipeline processor having a hardware loop function related to the present invention shown in FIG. 11, FIG. 12A and FIG. 12B are compared with those of the conventional pipeline processor shown in FIG. 13, FIG. 14A, FIG. 14B and FIG. 14C, a jump instruction is necessary in case where the "loop terminating" instruction cannot terminate the loop by the results of the operation execution. However, the "jump" instruction does not execute data processing, therefore overhead is generated. Unless the "loop terminating" instruction can perform the operations and data transfers at the same time, these instructions are needed as additional instructions and more number of loop times result in the more execution cycles. Further, when the cause of the loop termination cannot be easily determined in the postprocessing of the loop processing, it must be determined by using the operation unit, data bus and the like, and thus more registers and execution cycles are necessary.

In the pipeline processor having a hardware loop function related to the present invention, as stated above, when the content of the flag register which is selectively set by the results of the operation execution is the value that is already set by the instruction, the program loop can be terminated by the loop terminating instruction. Consequently, a loop processing program wherein the data processing efficiency in the loop is not adversely affected can be execute.

Further, when the operation executing unit has performed the predetermined operations and has transferred data by the loop terminating instruction, the value of the flag register before the operations by the operation executing unit 9 is read into the loop control unit 11 and whether the loop processing must be terminated or not is determined; therefore the processings performed at the moment of loop termination are facilitated.

Further, since the data can be transferred by the loop terminating instruction, an extra instructions for data transfer do not need to be executed, the data processing efficiency is improved.

Furthermore, since the content of the flag register is selectively set according to whether the content of the instruction address stack is returned to the program counter or not, whether the loop processing must be terminated or not can be set.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A pipeline processor having a hardware loop function, comprising:

an instruction pipeline processing unit which has at least one input stage and at least one output stage;

an instruction memory which stores instructions, including a loop start instruction for starting a loop processing and a loop terminating instruction for terminating the loop processing, to be inputted to the input stage of said instruction pipeline processing unit;

a program counter which outputs an instruction address for specifying an instruction to be inputted from said instruction memory to said instruction pipeline processing unit;

an instruction address stack which selectively holds content from said program counter, and can return said content back to said program counter when loop processing is started by said loop start instruction;

a loop counter to which an initial value of loop times is set, and which can be decremented;

a loop control unit which sets the initial value of loop times into said loop counter when said instruction pipeline processing unit executes said loop start instruction, and said loop control unit detects whether a current value of said loop counter is a predetermined value or not when said instruction pipeline processing unit executes said loop terminating instruction, returns the content of said instruction address stack to said program counter and decrements the current value of said loop counter when a detection result is other than the predetermined value, and terminates the loop processing when the detection result is the predetermined value;

an operation executing unit which executes operations according to the instructions outputted from the output stage of said instruction pipeline processing unit; and a flag register which is selectively set with contents according to result of the operations executed by said operation executing unit;

the pipeline processor further comprising:

a transfer path which transfers the contents set in said flag register to said loop control unit;

wherein said loop control unit reads said flag register via said transfer path when said instruction pipeline processing unit executes said loop terminating instruction, and terminates the loop processing when the contents set in said flag register are the predetermined value.

2. The pipeline processor having a hardware loop function as set forth in claim 1, wherein said operation executing unit executes predetermined operations upon execution of said loop terminating instruction; and said loop control unit reads the contents of said flag register which were set before said loop terminating instruction is executed by said operation executing unit via said transfer path.

3. The pipeline processor having a hardware loop function as set forth in claim 2, further comprising a data bus for supplying data to be operated upon by said operation executing unit; and data transfer via said data bus is initiated by execution of said loop terminating instruction.

4. The pipeline processor having a hardware loop function as set forth in claim 1, wherein the contents of said flag register are selectively set by the operation executing unit according to whether the content of said instruction address stack is returned to said program counter or not when said loop terminating instruction is executed.

* * * * *